United States Patent
Mathis

(10) Patent No.: US 9,407,651 B2
(45) Date of Patent: *Aug. 2, 2016

(54) ANOMALY DETECTION IN NETWORK-SITE METRICS USING PREDICTIVE MODELING

(71) Applicant: Adobe Systems Incorporated, San Jose, CA (US)

(72) Inventor: Craig M. Mathis, American Fork, UT (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,854

(22) Filed: Sep. 10, 2015

(65) Prior Publication Data

US 2015/0381648 A1    Dec. 31, 2015

Related U.S. Application Data

(63) Continuation of application No. 13/651,176, filed on Oct. 12, 2012, now Pat. No. 9,197,511.

(51) Int. Cl.
*H04L 29/06* (2006.01)
*H04L 12/24* (2006.01)
*H04L 12/26* (2006.01)

(52) U.S. Cl.
CPC .......... *H04L 63/1425* (2013.01); *H04L 41/145* (2013.01); *H04L 41/147* (2013.01); *H04L 43/08* (2013.01)

(58) Field of Classification Search
CPC ........ G05B 23/0224–23/0254; G05B 23/0259; G05B 23/0283; H04L 41/145; H04L 41/147; H04L 43/08; H04L 63/1425
See application file for complete search history.

(56) References Cited

U.S. PATENT DOCUMENTS

| | | | | |
|---|---|---|---|---|
| 9,197,511 | B2 * | 11/2015 | Mathis | H04L 41/145 |
| 2007/0055477 | A1 * | 3/2007 | Chickering | G06K 9/00503 702/182 |
| 2008/0177686 | A1 * | 7/2008 | Buyuktosunoglu | G05B 13/048 706/46 |
| 2010/0030544 | A1 * | 2/2010 | Gopalan | H04L 41/142 703/13 |
| 2010/0031156 | A1 * | 2/2010 | Doyle | H04L 41/142 715/736 |
| 2011/0119374 | A1 * | 5/2011 | Ruhl | G06F 17/3089 709/224 |
| 2011/0137697 | A1 * | 6/2011 | Yedatore | G05B 23/0283 705/7.13 |
| 2012/0259583 | A1 * | 10/2012 | Noboa | G05B 15/02 702/179 |
| 2013/0024172 | A1 * | 1/2013 | Suyama | G05B 23/0232 703/2 |

OTHER PUBLICATIONS

Notice of Allowance in related U.S. Appl. No. 13/651,176 dated Jul. 24, 2015, 25 pages.

* cited by examiner

*Primary Examiner* — Brian J Gillis
*Assistant Examiner* — Gil H. Lee
(74) *Attorney, Agent, or Firm* — Kilpatrick Townsend & Stockton LLP

(57) ABSTRACT

Methods and apparatus for anomaly detection in network-site metrics using predictive modeling are described. A method comprises obtaining time-series data for a given time range, wherein the time-series data comprises values for a network-site analytics metric for each of a plurality of sequential time steps across the given time range. The method includes generating a predictive model for the network-site analytics metric based on at least a segment of the time-series data. The method includes using the predictive model to predict an expected value range for the network-site analytics metric for a next time step after the segment and, based on the expected value range, determining whether an actual value for the network-site analytics metric for the next time step is an anomalous value.

15 Claims, 8 Drawing Sheets

ANOMALY DETECTION IN NETWORK-SITE METRICS USING PREDICTIVE MODELING

CROSS-REFERENCE TO RELATED APPLICATIONS

This application is a Continuation of U.S. patent application Ser. No. 13/651,176, filed Oct. 12, 2012 and entitled "ANOMALY DETECTION IN NETWORK-SITE METRICS USING PREDICTIVE MODELING", the entirety of which is incorporated herein by refernce.

BACKGROUND

Modem data analytics creates vast volumes of data. In the past, analysis tools have performed poorly at identifying anomalies in these vast pools of data. Such anomaly identification is sometimes performed, in-part, with moving average analysis. However, even with moving average analysis the process has still been man-hour intensive and, because of the large volumes of data, it has been easy to get lost down a path of data that may lead to nowhere or is ultimately not interesting. Thus, due in part to the large amounts of data and the large number of associated metrics, data analysts may not even know where to begin their analysis. As such, some analysts become tied to a particular familiar metric simply because they have been otherwise unable to narrow the field of data to what is interesting for the particular set of data or because the industry has chosen a few select metrics by default.

Furthermore, some web analytics data may have a cyclical nature that is poorly suited to moving average analysis. Cyclical behavior may exist for any number of reasons, for example but not limited to, seasonality, periods of time, holidays, etc. Using a running average based upon high volume week-day traffic to search for anomalies in low volume weekend traffic may obtain poor results because an expected range determined by high volume traffic may fail to detect anomalies when applied to actual low volume traffic values, for example.

SUMMARY

Various embodiments of methods and apparatus for anomaly detection in time series data using predictive modeling are disclosed. The method includes performing, by one or more computing devices obtainment of time-series data for a given time range. The time-series data includes values for a network-site analytics metric over time. The method includes generating a predictive model for the metric based on a segment of the time-series data and using the predictive model to predict an expected value range for the network-site analytics metric for a future time. Then, determining whether an actual value for the network-site analytics metric for the next time step is an anomalous value based on the expected value range.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below in order to not obscure claimed subject matter. Such methods, apparatuses or systems are not described because they are well known by one of ordinary skill in the art.

Various embodiments of methods and apparatus for anomaly detection in network-site metrics including predictive modeling are disclosed. A metric is a measure of activities or performance. Network-site metrics measure the activities and/or performance of a computer network-site, for example, a web-content site. Time series network metrics measure the activities and/or performance of a computer network-site over time. Although there are numerous network-site analytics that may be analyzed by the disclosed system and methods, some exemplary, non-exhaustive examples include revenue, file download views, successful sign ins, returning customer count, product registrations (possibly broken down by region, etc.), click-throughs, impressions, visitors, visits, page views, conversions, etc., as used in the examples herein.

In the disclosed embodiments, time-series data (e.g., data for a given metric over a given time range) may be obtained. A model may be selected that best fits (e.g., represents) the time series data. A number of models may be tried and selection of a best fitting model may be performed by an iterative process. A portion of the time-series data may be used as training data to generate a predictive model that predicts a value or value range for a next time step. Subsequently, an actual measured value for the next time step may be compared to the predicted value range and if the actual value exceeds the value range, it may be identified as an anomalous value. In some embodiments, the value range (and thus determination of an anomaly) depends upon a confidence level of the prediction. The system may then step ahead one time step (e.g., one day) using the actual value to update the model and again predict the next value, and so on.

In some embodiments, a notification may be sent in response to determining that the actual value for the next time step is an anomalous value. For example, a proactive alert may be sent to a user, and in another example a notification may indicate the actual value as an anomalous value in a report display for the metric. In some examples, a user (e.g., an advertiser) may be automatically notified of an anomaly in the data, near-to or in real-time.

Systems for Anomaly Detection in Network-Site Metrics Using Predictive Modeling

Figure 1:
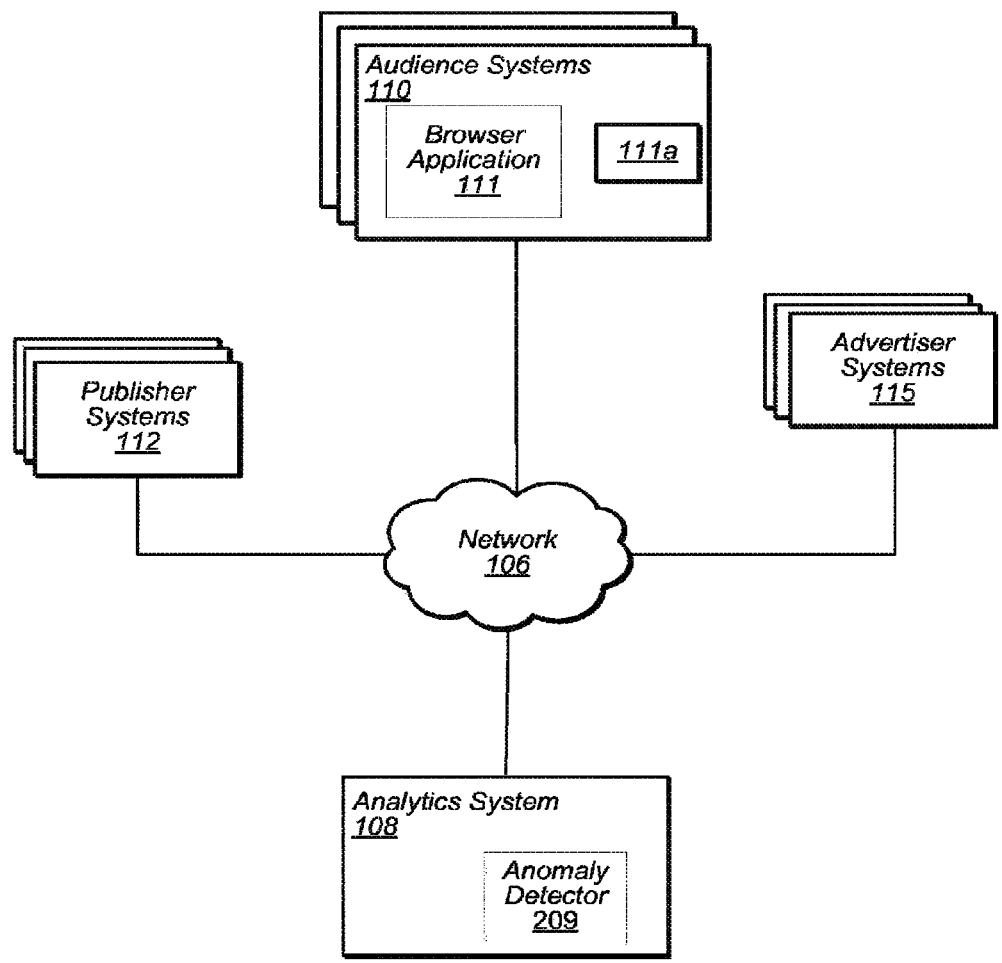
FIG. 1 illustrates a network content analytics system configured to support anomaly detection of network-site metrics using predictive modeling in accordance with one or more embodiments.

FIG. 1 illustrates a network of systems connected by network 106. In some embodiments, network 106 includes an electronic communication network, such as the Internet, a local area network (LAN), a cellular communications network, or the like. Network 106 may include a single network or combination of networks that facilitate communication between each of the entities. In the depicted embodiment, publisher systems 112, analytics systems 108, audience systems 110 and advertiser systems 115 are all connected via network 106. Generally, publisher systems 112 may be content sites such as Facebook® or Google®) and the like that publish content via network 106, for use by audience systems 110. Audience systems 110 may be end-user systems that also receive advertising associated with the content from publisher systems 112. Advertiser systems 115 provide advertisements. These advertisements are generally transmitted to the publisher systems 112 where they are used in advertising campaigns on content sites viewed by audience systems 110. In various embodiments, the advertisements may come from either of advertising systems 115 or publisher systems 112. Furthermore, analytics systems 108 gathers analytics data related to the audience systems 110, the content published by publisher systems 112 and the advertising from advertiser systems 115.

The disclosed systems and methods describe an anomaly detector for network-site metrics. The anomaly detector 209 may be part of analytics system 108. The analytics system 108 captures and analyzes data for use by the anomaly detector. In various embodiments, analytics system 108 retrieves network-site analytics metrics (e.g., revenue, file download views, successful sign in count, returning user count, product registration count, impressions, click throughs, visitors, visits, page views, conversions, etc.). Generally, an anomaly detector analyzes data to find anomalies in data. For example, anomaly detector 209 may analyze data such as network-site metrics to find anomalies in the data. Anomaly detector 209 detects anomalies in the data by using the data to construct predictive models, embodiments of which are discussed in more detail below.

Publisher systems 112 may include computers or similar devices used to publish content from content web sites to audience systems 110, sometimes along with advertisements. Publishing systems 112 may include content servers for providing web content such as html files that are loaded by audience systems 110 for viewing webpages of publisher systems 112.

Audience systems 110 may include a computer or similar device used to interact with publisher systems 112 and content sites thereof. In some embodiments, audience systems include a wireless device used to access content (e.g., web pages of a web site) from publisher systems 112 via network 106. For example, audience systems may include a personal computer, a cellular phone, a personal digital assistant (PDA), or the like.

In some embodiments, audience systems 110 may include an application (e.g., internet web-browser application) 111 that may be used to generate a request for content, to render content, and/or to communicate a request to various devices on the network. For example, upon selection of a website link on a webpage 111a displayed to the user by browser application 111, the browser application 111 may submit a request for the corresponding webpage/content to publisher systems 112, and the publisher systems 112 may provide corresponding content, including an HTML file, that is executed by a browser application 111 to render the requested website for display to the user. In some instances, execution of the HTML file may cause browser application 111 to generate an additional request for additional content (e.g., an image referenced in the HTML file as discussed below) from a remote location, such as advertiser systems 115 and/or analytics systems 108. The resulting webpage 111a may be viewed by a user via a video monitor or similar graphical presentation device of audience system 110. While a webpage 111a is discussed as an example of the network content available for use with the embodiments described herein, one of skill in the art will readily realize that other forms of content, such as audio or moving image video files, may be used without departing from the scope and content herein disclosed. Likewise, while references herein to HTML and the HTTP protocol are discussed as an example of the languages and protocols available for use with the embodiments described herein, one of skill in the art will readily realize that other forms of languages and protocols, such as XML or FTP may be used without departing from the scope and content herein disclosed.

In various embodiments, analytics systems 108 includes a system for the tracking and collection and processing of network-site data, and the generation of corresponding network-site metrics. Network-site metrics may include information relating to the activity and interactions of one or more users with a given website or webpage. For example, network-site metrics may include historic and/or current website browsing information for one or more website visitors, including, but not limited to identification of links selected, identification of web pages or advertisements viewed, identification of conversions (e.g., desired actions taken—such as the purchase of an item), number of purchases, value of purchases, and other data that may help gauge user interactions with webpages/websites/advertisements. In some embodiments, network-site metric data may be accumulated over time to generate a set of analytics data (e.g., an analytics dataset) that may be representative of activity and interactions of one or more users with a given website, webpage, advertisement or creative. Analytics data may be processed to generate metric values that are indicative of a particular trait or characteristic of the data (e.g., a number of website visits, a number of items purchased, value of items purchased, a conversion rate, a promotion effectiveness index, etc.).

A non-exhaustive, exemplary list of network-site metrics includes click through rate (CTR), conversion rate, revenue per click (RPC), revenue per impression (RPM), cost per click (CPC), cost per action (CPA), and cost per impression (CPM), etc. Collected data may also include analytics reports including various metrics of the analytics data (e.g., a promotion effectiveness index and/or a promotion effectiveness ranking).

Analytics systems 108 may include a network site traffic data collection and analysis service. In the illustrated embodiment, for example, analytics system 108 is communicatively coupled to audience systems 110 via network 106. Analytics system 108 may receive analytics data collected from server logs, web bugs and the like. Accordingly, in one embodiment, analytics system 108 may perform trend ascertainment and predictive functions described herein. Analytics system 108 collects data via various methods. For example, analytics system 108 may service requests from one or more audience systems 110. For example, upon loading/rendering of a webpage 111a from publisher systems 112 by browser 111 of audience systems 110, browser 111 may generate a request to analytics systems 108 via network 106. Analytics system 108 may process the request and return appropriate content (e.g., an image) to browser 111 of audience systems 110. In some embodiments, the request includes a request for an image, and analytics system 108 simply return a single transparent pixel for display by browser 111 of audience systems 110, thereby fulfilling the request. The request itself may also include web analytics data embedded therein. Some embodiments may include publisher systems 112 embedding or otherwise providing a pointer to a resource, known as a "web bug", within the HTML code of the webpage 111a provided to audience systems 110. The resource may be invisible to a user, such as a transparent one-pixel image for display in a web page. The pointer may direct browser 111 of audience systems 110 to request the resource from analytics system 108. Analytics system 108 may record the request and any additional information associated with the request (e.g., the date and time, and/or identifying information that may be encoded in the resource request). Analytics system 108 may parse the request to extract the data contained within the request. Analytics system 108 may process the data to generate one or more reports, including graphical displays and trend and prediction analysis. For example, analytics system 108 may filter the raw performance data to be used by anomaly detector 209 in generating models and predictions. Reports, for example, may include overviews and statistical analyses describing the rate of converting a website visit to a purchase (e.g., conversion), an effectiveness of various promotions, and so forth, and identifying trends in and making predictions from the data as requested.

Figure 2:
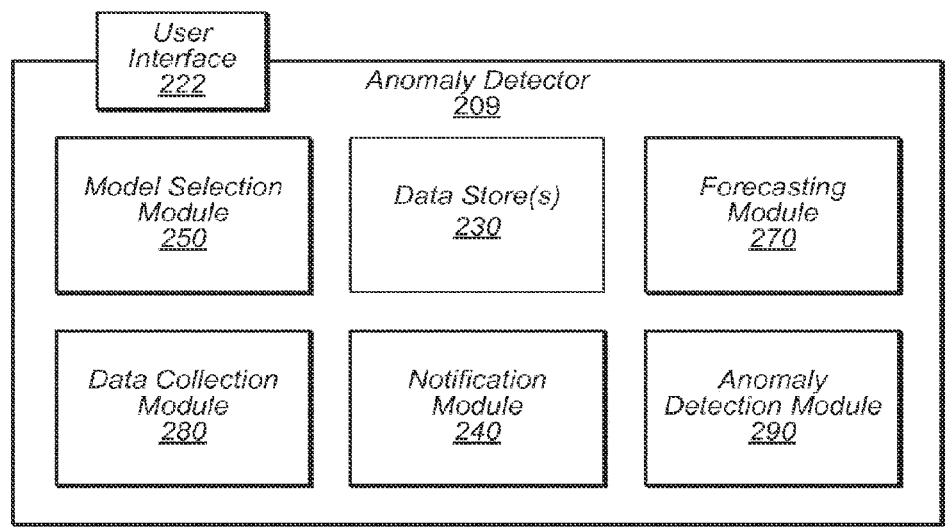
FIG. 2 depicts a system that implements anomaly detection of network-site metrics, according to some embodiments.

FIG. 2 depicts a particular embodiment of anomaly detector 209. In some embodiments, anomaly detector 209 implements anomaly detection of network analytics in accordance with embodiments of the invention illustrated in FIGS. 4 and 5. Anomaly detector 209 includes, among other modules, data collection module 280 for collecting data for use in the rest of the process. Data collection module may interact with any of the other modules of the anomaly detector 209 to collect or provide data, parameters and preferences as needed. Data collection module 280 may collect network-site metric data from analytics systems 108. In some embodiments, data collection module 280 gathers the network-site metrics directly from audience system 110 or publisher systems 112. Data collection module 280 may also collect model parameters and preferences. In some embodiments, the parameters and preferences may be entered via user interface 222 or collected from advertiser systems 115. In some embodiments, collection of the data, parameters and preferences may be an automated process, performed via application programming interfaces (API) for example.

In some embodiments, the network-site metric data may be manipulated (e.g., by either analytics systems 108 or data collection module 280 of the anomaly detector 209 in preprocessing to make the data more suitable for analysis. The collected data may be used to create a predictive model.

In some embodiments, model selection module 250 selects, from a group of possible models, a model particularly suited to the data of interest, and generates a predictive model based on at least a segment of the data for use by forecasting module 270. In one embodiment, the model selection module uses a segment of the time-series data as training data to generate multiple different predictive models according to multiple different time-series forecasting techniques and selects one of the predictive models based on a data fitting measure. More details of the model selection process are discussed below in regard to FIG. 5.

Figure 6A:
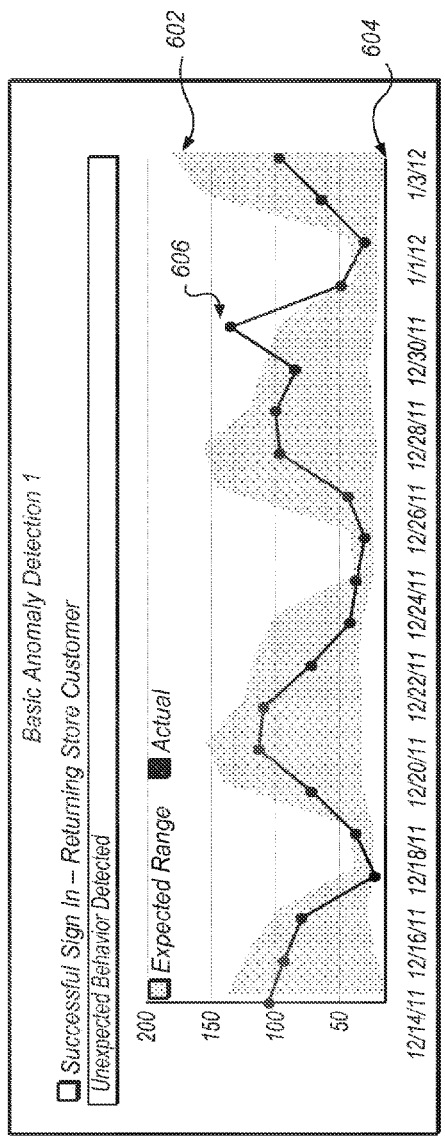
FIGS. 6A, 6B and 6C illustrate expected ranges and actual metric values in accordance with some embodiments.
Figure 6B:
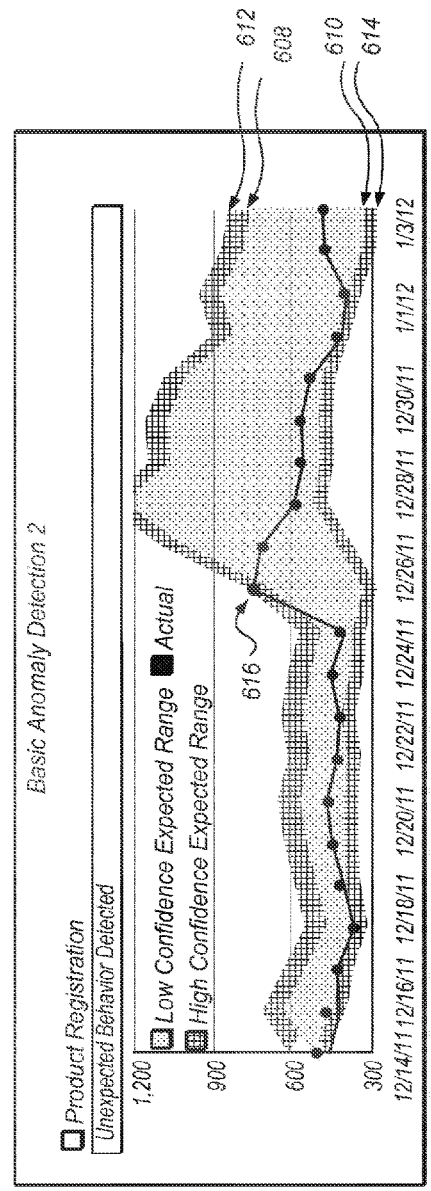
Figure 6C:
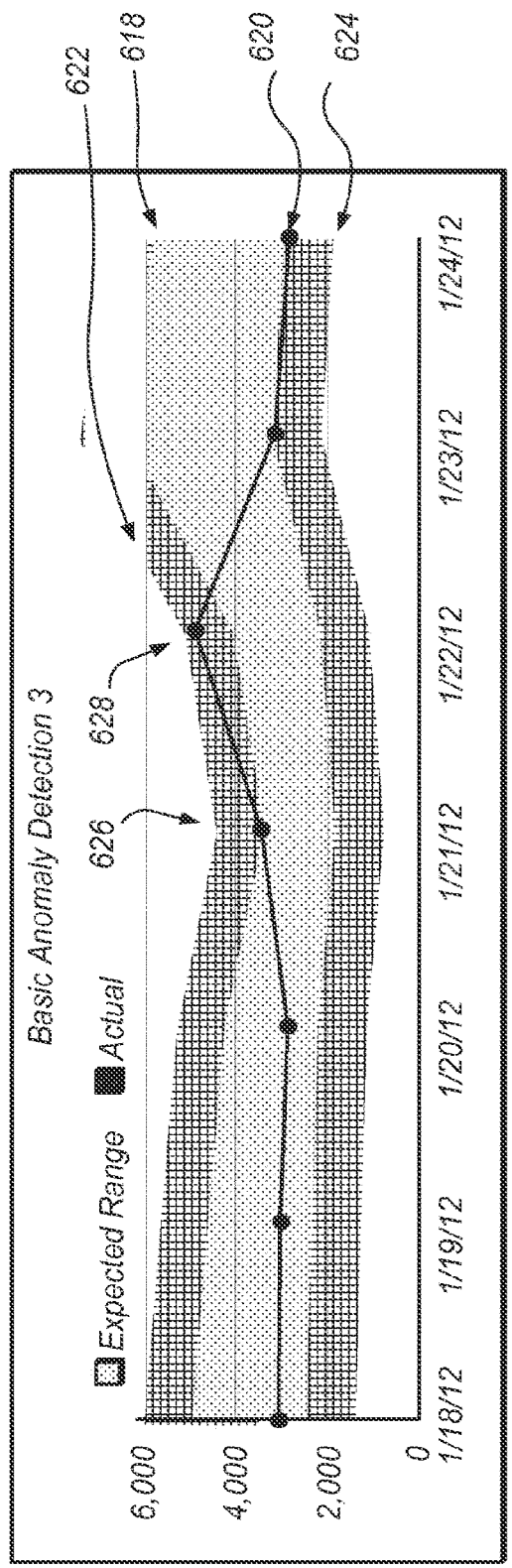

The forecasting module 270 uses the predictive model to forecast an expected value range for the network-site analytics metric for the time step after the segment, as illustrated and describe in more detail in FIGS. 6A-6C. The predicted expected range may be used by the anomaly detection module 290 for analyzing an actual value. Details of the prediction process are discussed in more detail below in regard to FIG. 4.

Anomaly detection module 290 detects when the actual value is outside the expected value range. For example, an anomalous value may be determined by whether the actual value exceeds the expected value range by a threshold amount. Note that some embodiments determine the expected value range according to a configured confidence level of the expected values for the predictive model. In another example, an anomalous value may be determined by whether the actual value is one of a plurality of actual values for the network-site analytics metric that exceed respective expected value ranges for consecutive time steps. More details of anomaly detection are described below in regard to FIG. 6.

Notification module 240 may send a notice of the anomaly. For example, notification module may send a real time alert to a user (e.g., via user interface 222 or via API) of the system or to a client. In another example, the anomaly may be reported or displayed visually as depicted herein or in other contemplated reports.

Process for Anomaly Detection in Network-Site Metrics Using Predictive Modeling

Figure 3:
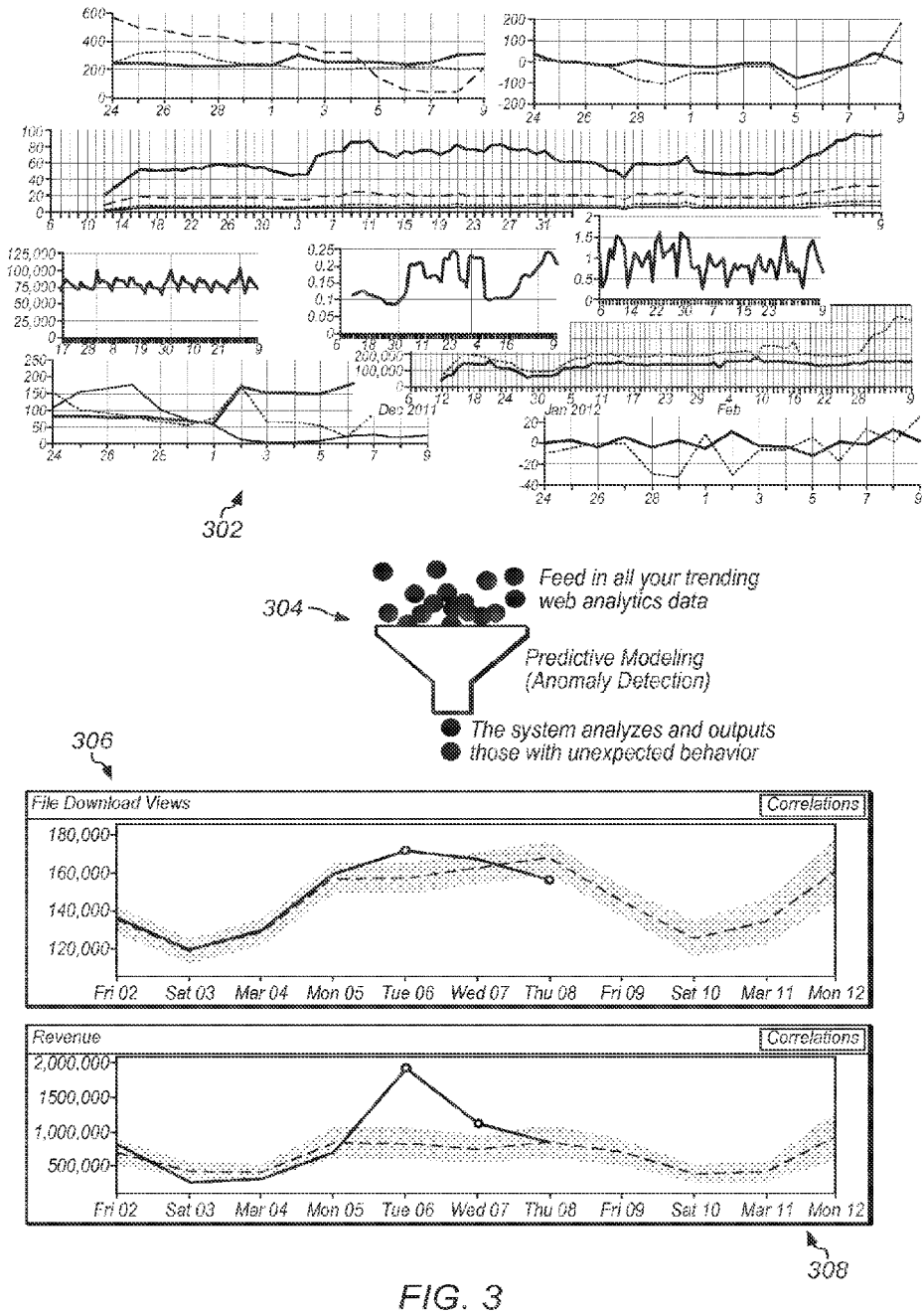
FIG. 3 illustrates a high level process flow diagram of anomaly detection of network-site metrics using predictive modeling in accordance with one or more embodiments.
Figure 4:
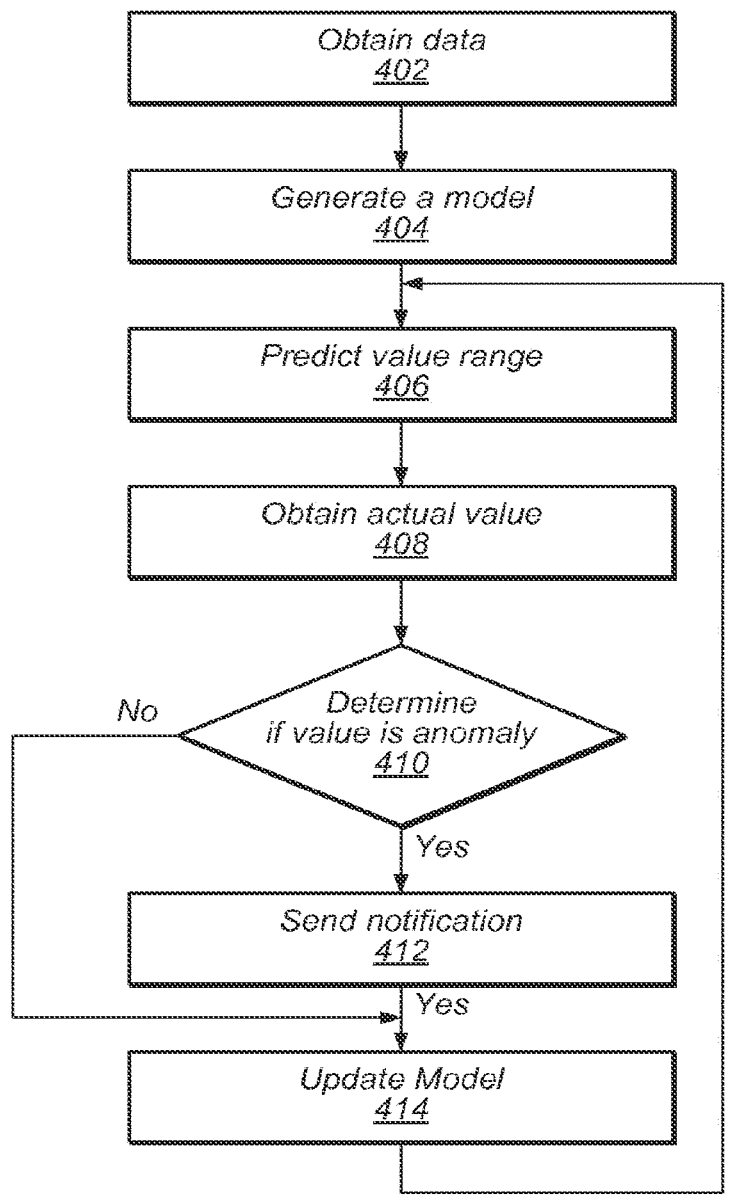
FIG. 4 depicts a high-level graphical representation of one embodiment of anomaly detection of network-site metrics using predictive modeling in accordance with one or more embodiments.
Figure 5:
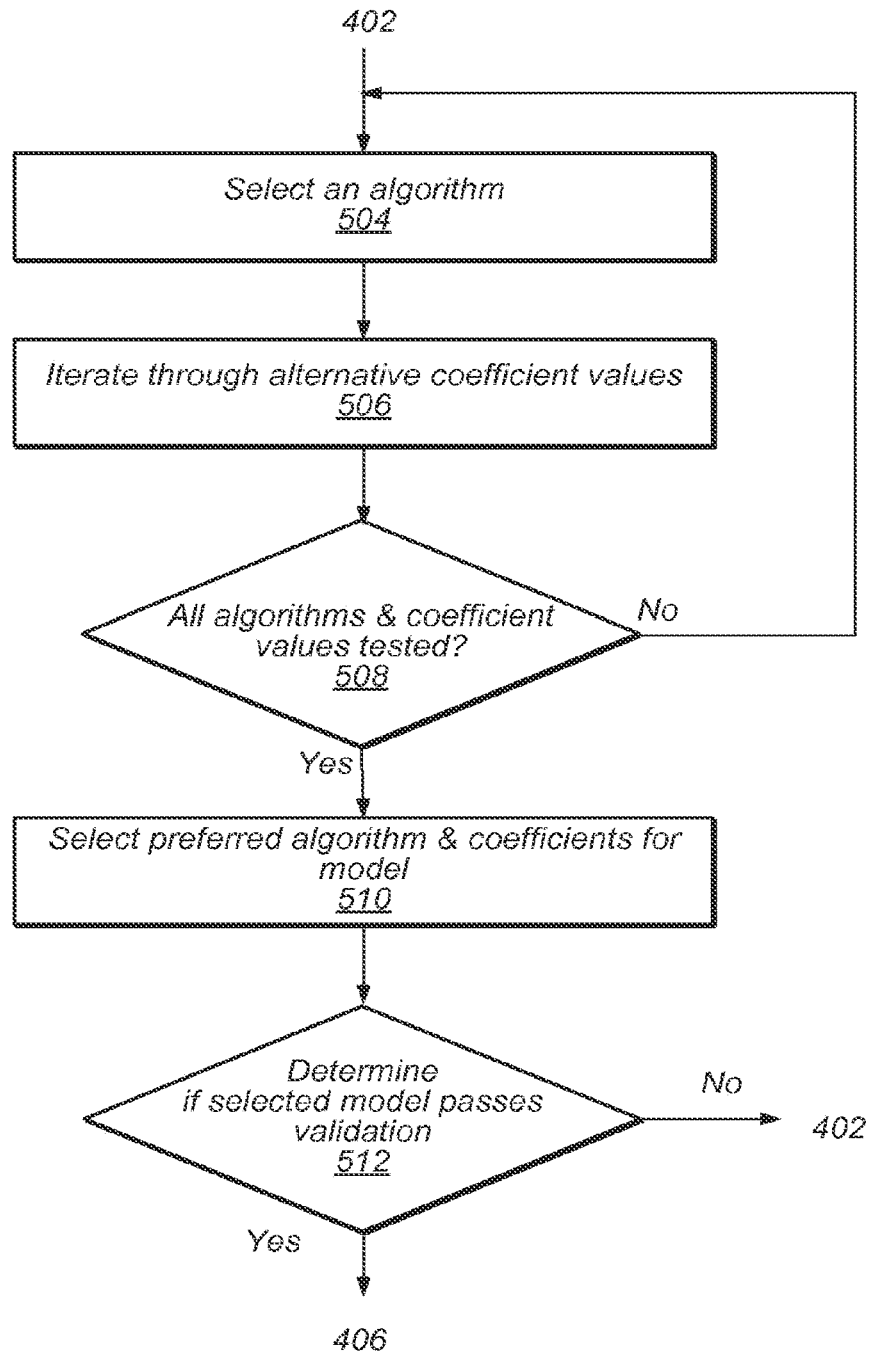
FIG. 5 illustrates a high-level logical flowchart of operations performed to implement model selection for anomaly detection of network-site metrics using predictive modeling in accordance with one or more embodiments.

FIG. 3 serves as a high level illustration of the processes described in further detail in FIGS. 4, 5, herein. Data, such as time series web metrics 302 are fed into a predictive modeling and anomaly detection process 304 that analyzes the data, creates models and identifies anomalies as illustrated in 306 and 308. The expected results of the analysis are values with unexpected behavior. For example, in the file download views chart 306, the dashed line represents a predicted value for a metric over time. Also, the solid line extending from Fri 02 until Thu 08 connects the actual values of the same metric. The highlighted area extending above and below the predicted value line represents a range between an upper bound and a lower bound around the expected value. In one embodiment, anomalies are identified as actual values that are outside the predicted range. For example, an anomaly is highlighted for the Tue 06 value just above 160,000 in chart 306. A second anomaly is highlighted for the Thu 08 value at about 150,000 in chart 306. As can be seen in the illustration, the expected value may rise and fall over time according to the model prediction and the range between the upper and lower bound may widen or narrow over time according to the model prediction as well. In some embodiments the range widens as the predictions are made further in the future because the error rate of the predictive model increase as the predictions move further past the last known value in time. For example the range between the upper and lower bound at Sat 03 is not as wide as the range between the upper and lower bound at Mon 12. In a similar fashion, the revenue chart illustrates two anomalies at Tue 06 and Wed 07. In some systems, the Correlations button will direct the software system to display an illustration of correlated metrics or allow a user to perform correlative activity. Correlations may be metrics and/or events that appear to move together in some manner for some period of time and recognizing a correlation among metrics/events may provide clues explaining the movement, especially if it is anomalous movement.

Note that charts 306, 308 display actual data up to Thu 08 and that forecasted values and confidence levels are projected over a number of future days beyond. Some embodiments forecast for one time-step forward while other embodiments forecast for a plurality of forward time steps, as illustrated. Also note that the width of the shaded range grows wider, indicating less accuracy in the predicted values that are further in the future for a given confidence level.

FIG. 4 illustrates a high-level logical flowchart of operations to implement one embodiment of anomaly detection using predictive models. In some embodiments, the disclosed operations automatically identify anomalies in data by building a model that represents historical values for the data and then uses the model to predict a value for the next time step. If the actual value is not within a certain range of the predicted value, the actual value may be identified as an anomaly and a notice of the anomaly may be sent. Operations may then be performed to update the model, predict the next value range, compare the predicted value to the actual value and so on. In some embodiments, the operations are automatically performed for a number of metrics and for a number of time steps.

In one embodiment, the process illustrated in FIG. 4 may be performed by anomaly detector 209. For any given time segment (e.g., 1 week, 2 weeks, 3 days, etc.) the time step totals of time series metric data may be extracted or otherwise obtained for each metric on a given report suite along with some predetermined amount (e.g., 4 weeks) of previous data for use as training data, as indicated at 402. For example, the method may gather data by appending a number of previous days (e.g., 28) to act as the historical or training data for each of the metrics/events configured on a report suite. The time series data may be obtained by data collection module 280 in some embodiments. In one example, an API may be used to extract the historical or training data.

The data may be stored locally, in data store(s) 230 for example. Based on the obtained data, a predictive model may be generated, as indicated at 404. For example, the predictive model may be generated by model selection module 250. In some embodiments, to generate the predictive model, multiple candidate models may be considered via a model selection process as described below for FIG. 5. By applying the generated model to the historical data, a predicted value range may be determined for a next time step, as indicated at 406. For example, for a specified segment of the time series data (where the model was generated on a portion of the time series data immediately preceding the segment) a value range may be predicted for the first time step of the segment using the model. The expected upper and lower bounds may be calculated using the method that goes along with the selected algorithm. The calculated upper and lower bounds may form an expected range. Such analysis may involve the forecasted value, standard error and a confidence. As explained below, further iterations of the process of FIG. 4 may predict an expected value range for subsequent time steps of the segment. In some embodiments, the predicted value range may be determined by forecasting module 270. The actual measured value for the metric may be obtained, as indicated at 408. In some embodiments the actual value is used both to compare to the expected value range predicted for the time step as well as to update the data that the model is built from. In one example, for the next time step, the forecasting module 270 will update a rolling standard error and recalculate the expected upper and lower bound. The rolling error may be slightly different based on each algorithm, but is generally the square difference between the forecasted and actual value.

A determination is made if the actual value is outside the expected range to determine whether the actual value is an anomalous value as indicated at 410. If not, the actual value may be added to the data in in preparation for forecasting the next value at the next time (e.g., next day) as indicated at 410 (No). To avoid issues where an outlier/anomaly could affect the model or algorithm going forward, if the actual value is outside the expected range, the data may be updated with the upper or lower bound rather than the actual outlier value. In one example, the forecasting module 270 may perform the operation of updating the model.

Various embodiments use a time window to determine a period of time over which predictions are made. For example, when the actual value is received, as indicated at 408, anomaly detection may be performed using the upper and lower bound for the entire time step (e.g., time window) in question. In some embodiments, anomaly detection (as indicated at 410) may be performed by anomaly detection module 290. In some embodiments only a portion of the time window or a single time period may be used for anomaly detection. In some embodiments the actual value is receive real-time, while in other embodiments, the actual value is a historic value (but not as historic as the data used to generate the predictive model). For example, an advertiser may use the disclosed systems and methods to review historical data and find anomalies therein.

Also, various types of data call for various types of anomaly detection. As illustrated in FIGS. 6A-C, described below, some time series data may exhibit peaky characteristics while other time series data may exhibit more smooth characteristics. Other characteristics of the data are contemplated as well. Some time series data may test a new high or low for several days in a row with or without exceeding the range. Also, sometimes it is preferable to send a notification more often or less often for certain metrics. Disclosed are configurable systems and methods that may be adjusted or configured to suit the desired outcome. For example, confidence levels may be adjusted, multiple confidence levels may be used, and sliding windows may consider additional time steps. Thus, in some embodiments, the time window may be a single time period but in other embodiments the time window may be a number of time periods. For example, in one embodiment, anomaly detection module 290 applies a multiple time value (e.g., 3 day) moving window to the actual data values and determines instances where multiple surrounding points (e.g., consecutive points) are outside the expected range. In some embodiments, a time window with multiple time periods is combined with the use of multiple ranges (e.g., multiple ranges may be constructed from multiple confidence levels). For example, a system may be configured to detect an anomaly if a single point exceeds the range determined by a 99% confidence level. In another example, the same system may be configured to detect an anomaly when two consecutive values exceed a range determined by a slightly lower (e.g., 95%) confidence level. Such methods help avoid cases where a single point just barely goes outside the expected range. Note that the moving window may not be necessary in some embodiments.

If an anomaly is determined, as indicated at block 410 (Yes), then a notification may be sent as indicated at 412. For example, notification module 240 may send a notification to a user. In some embodiments, notification may be via email to the advertiser or publisher for example, or an indication on a display screen used to monitor the data (e.g., user interface 222). In some embodiments, notification may be sent to storage or appear in a report. If no anomaly is determined, as indicated at 410 (No) or, after a notification is sent, as indicated at 412, the model may be updated, as indicated at 414. The process may return to 406, where for the next time step a new value range is predicted and a new actual value received and so on. In some embodiments, a new model may be selected. For example, because characteristics of the data have changed and a new model may better represent the data or because a new set of data has been selected for analysis. In some embodiments, the same model may be used in the next iteration.

Generally, FIG. 5 is an illustration of an embodiment of the "Generate a model" block 404 in FIG. 4. Model generation may be performed to produce a model that can predict the next value for the next time step. In some embodiments, a model may be selected from a plurality of possible models based upon how well the model represents the data. Also, the data may have changing characteristics over time such that the model representing the data should be updated to reflect the changing characteristics. For example, the system may alter the type of model and/or model coefficients to better reflect the data as new values are added to the data or as other segments of the data are considered. Although certain types of models are discussed herein, other types of models and algorithms are contemplated without departing from the scope of the invention as determined by the claims.

In FIG. 5, a model algorithm or model type is selected, as indicated at 504, and an attempt to fit the algorithm to a portion of time series data is made. Fitting is performed by iterating through alternative values for coefficients of the algorithm, as indicated at 506, while applying a portion of the data to the variables. In one example, model selection module 250 selects an algorithm and then applies the various values for the coefficients which act as weights for the different inputs in the modeling equations.

The algorithm may be selected from among multiple different statistical models. Some embodiments may employ a moving average analysis. Some embodiments perform time series analysis. In some embodiments, time series analysis is better suited than moving average analysis because automated time series analysis takes cycles into consideration by applying a mathematical model that represents such cycles. For example, such analysis may identify when weekend volume is abnormally high or low compared to most other weekends while ignoring weekend volume changes that are more closely tied to regular cyclical changes. Also, in some embodiments, time series analysis may be better suited to cyclical data analysis than moving average because a moving average usually sets an upper and lower bound that is not adjusted for cycles while the time series analysis adjusts the upper and lower bounds according to recognized cyclical behavior. Although, in some embodiments, moving average analysis may be better suited for various other reasons.

Note that it is anticipated that algorithms will be developed and improved and integrated into the disclosed process without departing from the scope of this disclosure. Models in the following non-exhaustive, exemplary list may be tried in some embodiments:

Holts Trend Corrected (Double Exponential Smoothing)
Holt-Winters Additive with a period of 7 (Triple Exponential)
Holt-Winters Multiplicative with a Period of 7 (Triple Exponential)

A model may include at least a combination of an algorithm and associated coefficients. A preferred algorithm and preferred coefficients for the preferred algorithm may produce the smallest Sum of Squared Errors (SSE). The SSE may be determined by testing the algorithms, e.g., by varying the coefficients of the algorithms. In some embodiments, finding the preferred coefficients values is a process of iterating each value between 0.1 and 0.9, incrementing by 0.1. The process may iterate though the algorithms and various respective alternatives for the coefficients as indicated by 508 (No) until all of the algorithms and respective variable alternatives have been tested as indicated in 508 (Yes). If multiple models or multiple coefficients have met the criteria so far, a preferred algorithm and preferred values for the coefficients for the predictive model may be selected as the preferred model. In an exemplary embodiment, and for the smallest SSE, the Mean Absolute Percent Error (MAPE) will be calculated, e.g., 75% accuracy, and current standard error on the training data. Also, in some embodiments, when the model is updated for the next time step, a rolling standard error may be updated.

Once the preferred algorithm and coefficients have been selected, as indicated in 510, validation is performed, as indicated at 512. Validation may be performed by checking to see if the MAPE is less than some threshold, e.g., 25%, error. If so, as indicated at 512 (Yes), the process moves onto block 406. If the MAPE is not less than some threshold, as indicated at 512 (No), the algorithm/model may be marked as invalid, time series for that metric may be ignored and no anomalies are detected. For example, the process will return, as indicated at 512 (No) and obtain the next set of data. This may happen if the training data has a lot of variation and/or the current algorithms are not sufficient to model the data, for example. In some embodiments, the operations of selecting an algorithm, iterating through the alternative coefficient values for all the algorithms, selecting a preferred algorithm and coefficient values and validating the model that includes the preferred algorithm and coefficient values are all performed by the model selection module 250.

In various embodiments, rather than requesting historical data and rebuilding the model for each request, the current model will be cached and the coefficient values maintained. In some embodiments the model and coefficients are updated as needed. This may help to avoid the request for historical data (if the call was recently made for example).

FIGS. 6A, 6B and 6C illustrate expected ranges and actual values of metric values in accordance with one or more embodiments. FIG. 6A illustrates time series data for a metric, Successful Sign In—Returning Store Customer. The expected range is illustrated as the expanding and contracting shaded area from 12/14/11 to 1/3/12 with upper and lower bounds indicated by 602 and 604 for the 1/3/12 time step. Actual values are illustrated by the black dots on each time step, connected by the black line. In one embodiment, the actual value 606 on 12/30/11 is an anomaly because it exceeds the expected range for that time step.

In another example, FIG. 6B illustrates, depending on the confidence level applied, a potential anomaly detected at 12/25/11 of the Product Registration metric. In one embodiment the expected range, illustrated as the shaded region between upper bound 608 and lower bound 610 and extending from time step 12/14/11 to 1/3/12, may represent a range determined by a first (e.g., 95%) confidence level. In another embodiment, the range is determined by a second (e.g., 99%) confidence level that includes all of the first confidence level area plus some more area both above and below the shaded portion for each time step, as illustrated between upper bound 612 and lower bound 614 and extending from time step 12/14/11 to 1/3/12. In the example, actual value 616 would be an anomaly if the range determined by the first confidence level was used but would not be an anomaly if the range determined by the second confidence level was used. In some embodiments the first confidence level may be lower than the second confidence level.

FIG. 6C, in another example, illustrates, depending on the confidence level applied, potential anomalies detected at 1/21/12 and 1/22/12. In one embodiment the expected range, illustrated as the shaded region between upper bound 618 and lower bound 620 and extending from time step 1/18/12 to 1/24/12, may represent a first (e.g., 95%) confidence level. In another embodiment, the range is determined by a second (e.g., 99%) confidence level that includes all of the first confidence level area plus some more area both above and below the shaded portion, as illustrated between upper bound 622 and lower bound 624 and extending from time step 1/18/12 to 1/24/12. In some embodiments, for example, one using only the first confidence levels indicated by upper bound 618 and lower bound 620, both points 626 and 628 would each be anomalies because they each exceed the range. However, for other embodiments using the second confidence range indicated between upper bound 622 and lower bound 624, neither 626 nor 628 would be identified as anomalies. However, in some embodiments, the systems and methods may include logic that identifies an anomaly when, after a first actual value (e.g., 626), exceeds the first confidence level but not the second confidence level, a second actual value (e.g., 628), also exceeds the first confidence level but not the second confidence level. In some embodiments, when the actual value exceeds the predicted range at the first confidence level but not the second confidence level, an anomaly would not be declared unless the actual value exceeds the first confidence level for a specified number of consecutive time steps. The specified number may be a user-configurable parameter. In some embodiments, if the actual value exceeds both the first and second confidence levels, it will always be declared an anomaly. In some embodiments, instead of using a second confidence level, the upper band 622 and lower band 624 may be determined according to a set percentage of value with respect to the upper and lower band the range determined by the first confidence level. Other types of logic are contemplated and may be applied to the invention by one of skill in the art without departing from the spirit and scope of the invention as determined by the claims.

Various modifications, additions and alterations may be made to the invention by one skilled in the art without departing from the spirit and scope of the invention as defined in the appended claims. For example, the metric data may come from commercial services such as a data warehouse and possibly a Hadoop environment. In some embodiments, automation of the disclosed operations may be facilitated by an API acting as an interface between the various software components. In various embodiments, the disclosed systems and methods may leverage the features of another software system. For example, an analytics application, e.g., Site Catalyst®, may provide an API for the application's report suite and display window that may facilitate notification of anomalies as described herein. The disclosed methodology may be implemented as a web service where it may be exposed as a RESTful API, e.g., with JSON objects. The disclosed methodology may also be built on top of an HTTP service or other technologies such as Thrift, Ice, SOAP, etc. One of ordinary skill will recognize that this system would continue to grow over time and much of its feature set will be extended as resources and research are provided.

Example System

Figure 7:
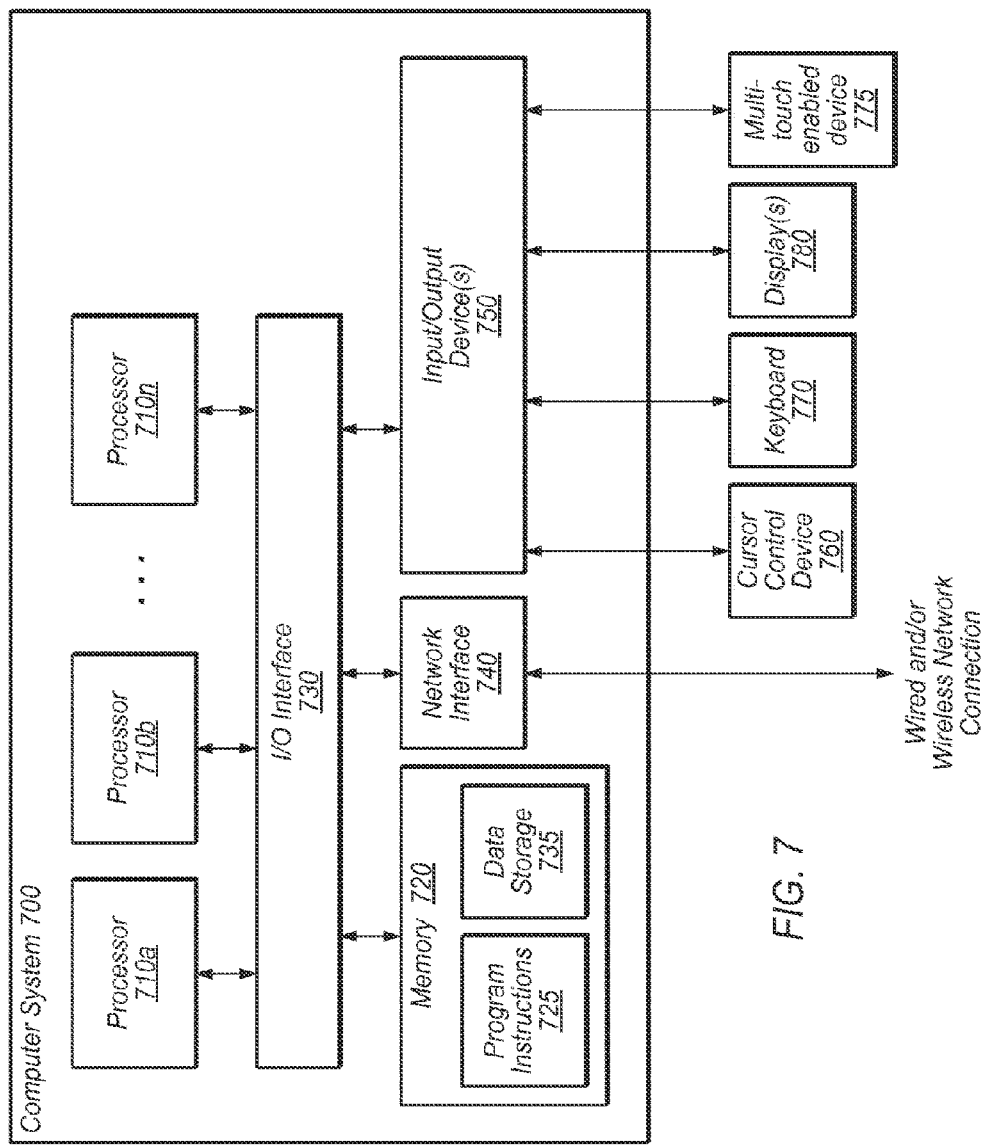
FIG. 7 illustrates an exemplary computer system for implementing anomaly detection of network-site metrics using predictive modeling in accordance with one or more embodiments.

Various components of embodiments of anomaly detection in network-site metrics using predictive modeling may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for anomaly detection in network-site metrics using predictive modeling may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for anomaly detection in network-site metrics using predictive modeling, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement embodiments anomaly detection in network-site metrics using predictive modeling, and data storage 735, comprising various data accessible by program instructions 725, for example anomaly detection in network-site metrics using predictive modeling. In one embodiment, program instructions 725 may include software elements of anomaly detection in network-site metrics using predictive modeling as illustrated in the above figures. Data storage 735 may include data that may be used in embodiments. For example one or more files containing programming instructions for anomaly detection in network-site metrics using predictive modeling, as described herein. In other embodiments, other or different software elements and/or data may be included.

Those skilled in the art will appreciate that computer system 700 is merely illustrative and is not intended to limit the scope of anomaly detection in network-site metrics using predictive modeling as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   performing, by one or more computing devices:
   obtaining time-series data for a given time range, wherein the time-series data comprises values for a network-site analytics metric for each of a plurality of sequential time steps across the given time range;
   generating a predictive model for the network-site analytics metric based on at least a segment of the time-series data, wherein the predictive model performs time-series analysis by taking recognized cycles into consideration by applying a mathematical model that represents the recognized cycles;
   using the predictive model to predict a first expected value range for the network-site analytics metric for a next time step after the segment in accordance with a first confidence level;

using the predictive model to predict a second expected value range for the network-site analytics metric in accordance with a second confidence level that is different from the first confidence level;

monitoring actual values to detect anomalies, wherein the anomalies are detected based on a first number of consecutive actual values outside of the first expected value range and a second number of a consecutive actual values outside of the second expected value range, wherein the first number is different from the second number; and in response to determining that the actual value for the network-site analytics metric for the next time step is an anomalous value, sending an alert to a user.

2. The method of claim 1, further comprising, in response to determining that the actual value for the network-site analytics metric for the next time step is the anomalous value, indicating the actual value as the anomalous value in a report display for the network-site analytics metric.

3. The method of claim 1, wherein monitoring the actual values to detect anomalies further comprises determining whether the actual value exceeds the expected value range by a threshold amount.

4. The method of claim 1, wherein monitoring the actual values to detect anomalies further comprises determining whether the actual value is one of a plurality of actual values for the network-site analytics metric that exceed respective expected value ranges for consecutive time steps.

5. The method of claim 1, wherein performing the time-series analysis by the predictive model predicts the expected value range so that:
   abnormally high or low weekend volumes are identified as anomalies; and
   weekend volume changes that are more closely tied to regular cyclical changes are not identified as anomalies.

6. A system, comprising:
   at least one processor; and
   a memory comprising program instructions that, when executed by the at least one processor, implement:
   obtaining time-series data for a given time range, wherein the time-series data comprises values for a network-site analytics metric for each of a plurality of sequential time steps across the given time range;
   generating a predictive model for the network-site analytics metric based on at least a segment of the time-series data;
   using the predictive model to perform a time-series analysis for at least the segment of the time-series data;
   using at least the time-series analysis to predict different expected value ranges for the network-site analytics metric for a next time step after the segment;
   using different expected value ranges based on different confidence levels to detect anomalies, wherein anomalies are detected base don actual values that are outside of the different expected values ranges for different numbers of consecutive occurrences;
   based on the different expected value ranges, determining whether an actual value for the network-site analytics metric for the next time step is an anomalous value, and
   in response to determining that the actual value for the network-site analytics metric for the next time step is an anomalous value, sending an alert to a user.

7. The system of claim 6, wherein using the predictive model to perform the time-series analysis takes into account recognized cycles by applying a mathematical model that represents the recognized cycles.

8. The system of claim 6, wherein determining whether the actual value for the network-site analytics metric for the next time step is the anomalous value comprises determining whether the actual value exceeds the expected value range by a threshold amount or determining whether the actual value is one of a plurality of actual values for the network-site analytics metric that exceed respective expected value ranges for consecutive time steps.

9. The system of claim 6, wherein the program instructions when executed by the at least one processor further implement said obtaining, said generating, said using, and said determining for a plurality of different network-site analytics metrics having respective values in each of the plurality of sequential time steps across the given time range.

10. The system of claim 6, wherein generating the predictive model comprises using the segment of the time-series data as training data to generate the predictive model according to a time-series forecasting technique.

11. The system of claim 6, wherein the program instructions when executed by the at least one processor further implement, in response to determining that the actual value for the network-site analytics metric for the next time step is the anomalous value, indicating the actual value as the anomalous value in a report display for the network-site analytics metric.

12. A non-transitory computer-readable storage medium storing program instructions that, when executed by a computing device, perform:
   obtaining time-series data for a given time range, wherein the time-series data comprises values for a network-site analytics metric for each of a plurality of sequential time steps across the given time range;
   generating a predictive model for the network-site analytics metric based on at least a segment of the time-series data;
   performing a time-series analysis by taking recognized cycles into consideration by applying a mathematical model that represents the recognized cycles;
   using the predictive model to predict a first expected value range for the network-site analytics for a next time step after the segment in accordance with first confidence level;
   using the predictive model to predict a second expected value range for the network-site analytics metric in accordance with a second confidence level that is different from the first confidence level;
   monitoring actual values to detect anomalies, wherein the anomalies are detected based on a first number of consecutive actual values outside of the first expected value range and a second number of consecutive actual values outside of the second expected value range,
   wherein the first number is different from the second number; and
   in response to determining that the actual value for the network-site analytics metric for the next time step is an anomalous value, sending an alert to a user.

13. The non-transitory computer-readable storage medium of claim 12, wherein the program instructions when executed by the computing device further perform updating the predictive model based on the actual value of the network-site analytics metric for the next time step or using an upper or a lower value of the expected value range instead of the actual value to update the predictive model when the actual value exceeds the expected value range.

14. The non-transitory computer-readable storage medium of claim 12, wherein performing the time-series analysis comprises using the predictive model to perform the time-series analysis.

15. The non-transitory computer-readable storage medium of claim 12, wherein using the predictive model to predict the expected value range comprises predicting the expected value range so that:
- abnormally high or low weekend volumes are identified as anomalies; and
- weekend volume changes that are more closely tied to regular cyclical changes are not identified as anomalies.

* * * * *